United States Patent
Chamberlain et al.

(10) Patent No.: US 10,132,604 B1
(45) Date of Patent: Nov. 20, 2018

(54) CAP FOR EXPLOSIVE WATER CHARGES

(71) Applicant: The United States of America as Represented by the Secretary of the Navy, Washington, DC (US)

(72) Inventors: Keith Chamberlain, Waldorf, MD (US); Lee Foltz, Indian Head, MD (US); Angel Diaz, Indian Head, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/932,014

(22) Filed: Jan. 25, 2018

(51) Int. Cl.
| | |
|---|---|
| *F42B 3/26* | (2006.01) |
| *F42B 33/06* | (2006.01) |
| *B65D 39/12* | (2006.01) |
| *B65D 47/06* | (2006.01) |
| *B33Y 80/00* | (2015.01) |
| *B65D 41/28* | (2006.01) |

(52) U.S. Cl.
CPC ............ *F42B 33/062* (2013.01); *B65D 39/12* (2013.01); *B65D 47/06* (2013.01); *F42B 3/26* (2013.01); *B33Y 80/00* (2014.12); *B65D 41/28* (2013.01)

(58) Field of Classification Search
CPC ................................. F42B 33/062; F42B 3/26
See application file for complete search history.

(56) References Cited

U.S. PATENT DOCUMENTS

| 7,185,775 | B1 | 3/2007 | Decal |
| 9,365,329 | B1* | 6/2016 | Chang ................ B65D 47/0876 |
| 2005/0184024 | A1 | 8/2005 | Santa Cruz et al. |
| 2007/0209500 | A1 | 9/2007 | Wilber |
| 2010/0304357 | A1 | 12/2010 | Meyers et al. |
| 2012/0097015 | A1 | 4/2012 | Alford et al. |
| 2014/0224101 | A1 | 8/2014 | Benson |
| 2014/0291360 | A1 | 10/2014 | Bracha |
| 2018/0141722 | A1* | 5/2018 | Langelaan ........... B65D 47/121 |

* cited by examiner

*Primary Examiner* — Stephen Johnson
*Assistant Examiner* — Joshua T Semick
(74) *Attorney, Agent, or Firm* — Fredric Zimmerman

(57) ABSTRACT

A cap for an explosive water charge includes a top surface and a generally cylindrical portion extending downwardly from the top surface. On the outer surface of the generally cylindrical portion are rings and cantilevered, pointed rectangles that enable a water tight fit in the neck of a drinking bottle. The cap is configured to hold a detonator, such as a blasting cap, and two different sizes of tubes of energetic material.

14 Claims, 5 Drawing Sheets

CAP FOR EXPLOSIVE WATER CHARGES

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates in general to explosive devices and in particular to explosive water charges.

BACKGROUND OF THE INVENTION

Omni-directional explosive water charges are used, for example, in explosive ordnance disposal (EOD) to disarm or otherwise render harmless an explosive device such as, for example, an improvised explosive device (IED). An omni-directional explosive water charge may include a water container and a tube of energetic material disposed in the water container. The energetic material may be detonated by a blasting cap. Such explosive water charges are commercially available, but often expensive.

Those in the field of EOD have a need for less expensive explosive water charges.

SUMMARY OF THE INVENTION

One aspect of the invention is a cap for an explosive water charge. The cap may include a central through hole, a top surface and a generally cylindrical portion extending downwardly from the top surface and configured for insertion in a neck of a drinking bottle. A plurality of rings may be formed on an outer surface of the generally cylindrical portion. The diameter of the rings may increase in the direction toward the top surface.

A plurality of cantilevered, pointed rectangles may be disposed below the plurality of rings and defined by slots formed through the generally cylindrical portion. Outer surfaces of the rectangles may be offset radially outward from the outer surface of the generally cylindrical portion.

A plurality of protrusions may be formed on an interior surface of the generally cylindrical portion. The plurality of protrusions may define a reduced diameter opening in the central through hole. The plurality of protrusions may be formed in areas between the plurality of cantilevered, pointed rectangles.

The central through hole may include a countersink at the top surface configured to receive a detonator. The reduced diameter opening may be configured to receive a tube of a first diameter with a press fit. The bottom of the central through hole may be configured to receive a tube of a second diameter with a press fit. The second diameter may be greater than the first diameter.

A circumferential skirt may extend downwardly from the top surface radially outward of the generally cylindrical portion.

Another aspect of the invention is an explosive water charge that may include the novel cap and a drinking bottle with a neck. The cap may be fixed to the neck by a press fit with one of the plurality of rings and by pressure of the plurality of cantilevered, pointed rectangles on an interior of the neck. The water charge may include a detonator disposed in the central through hole in the cap and a tube of energetic material disposed in the drinking bottle and in the cap.

The invention will be better understood, and further objects, features, and advantages thereof will become more apparent from the following description of the exemplary embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

One solution for reducing the cost of explosive water charges is to use commercial off the shelf (COTS) drinking bottles, such as, for example, personal size non-carbonated drinking bottles and personal size carbonated drinking bottles. The bottles must be modified to be able to hold a tube of energetic material and a blasting cap, for example. Such drinking bottles have an internal neck diameter of about 0.85 inches. Carbonated and non-carbonated drinking bottles may have slightly different inside diameter necks because the carbonated drinking bottles are manufactured to hold pressure while the non-carbonated drinking bottles are not. The inventive cap includes a portion that is inserted in the neck of a drinking bottle. The portion of the cap that is inserted has sufficient flexibility to fit tightly and function successfully in both carbonated and non-carbonated drinking bottles.

The novel bottle cap is configured for use with various COTS pre-filled types of carbonated and non-carbonated personal drinking bottles. With the novel bottle cap, inexpensive explosive water charges may be constructed from drinking bottles that were designed to hold carbonated or non-carbonated beverages. Further, the bottle cap is configured to receive and hold a detonator and to receive and hold two different sizes of energetic tubes.

Figure 1:
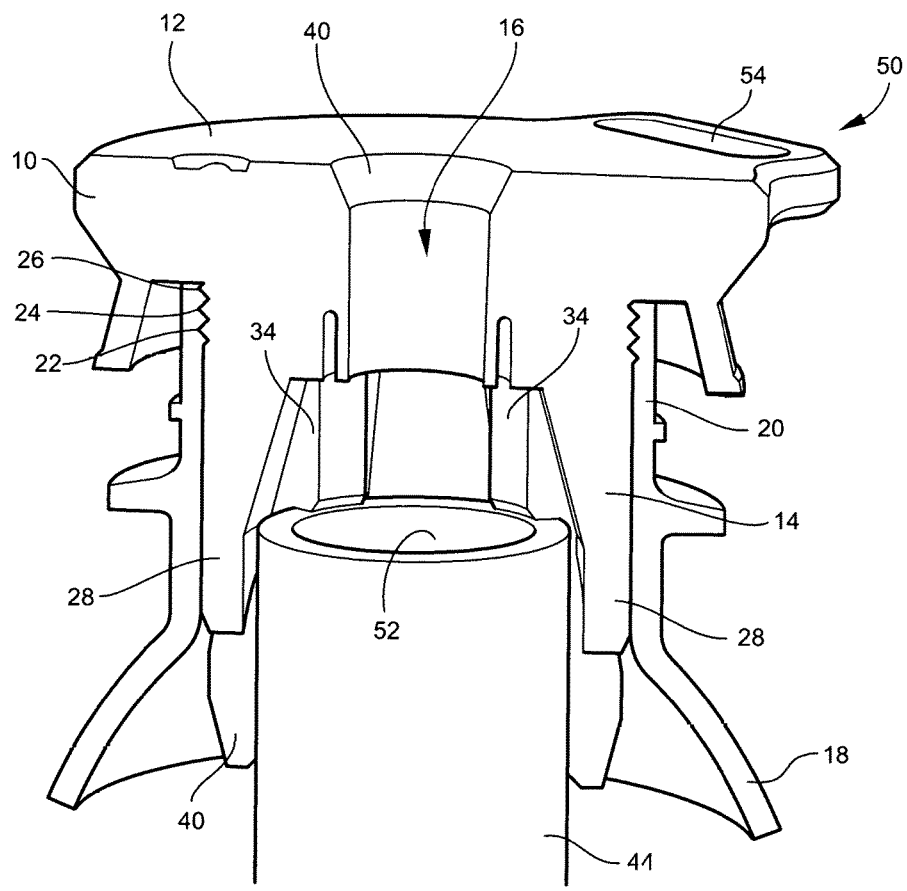
FIG. 1 is cutaway perspective view of one embodiment of a cap inserted in a drinking bottle for making an explosive water charge. Only the upper portion of the bottle is shown.
Figure 4:
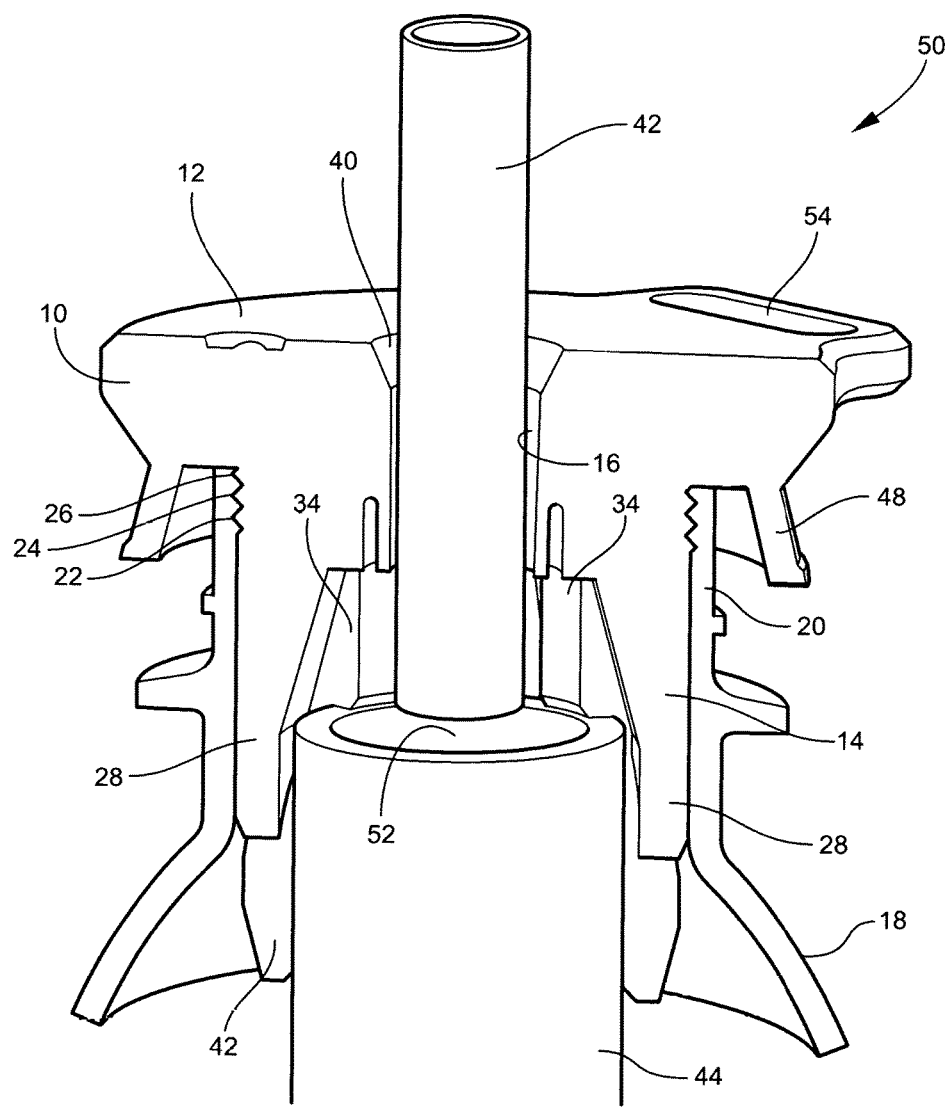
FIG. 4 is a view similar to FIG. 1 with a detonator inserted in the cap.

FIG. 4 is a cutaway partial perspective view of an exemplary embodiment of an explosive water charge 50. Charge 50 may include a COTS drinking bottle 18 having a neck 20. The novel cap 10 may be disposed in neck 20. An electric or non-electric detonator 42 may be inserted in a central through hole 16 in cap 10. FIG. 1 is similar to FIG. 4, without the detonator 42. A countersink 40 may be formed in the top surface 12 of cap 10. Countersink 40 may have a taper of, for example, about 1 to about 5 degrees and, more particularly, about 2 degrees. The detonator 42 may be fixed in through hole 16 with a press fit, for example. Detonator 42 may abut or be inserted in energetic material 52 in tube 44. Energetic material 52 may be, for example, C-4 or detonation cord.

Figure 5:
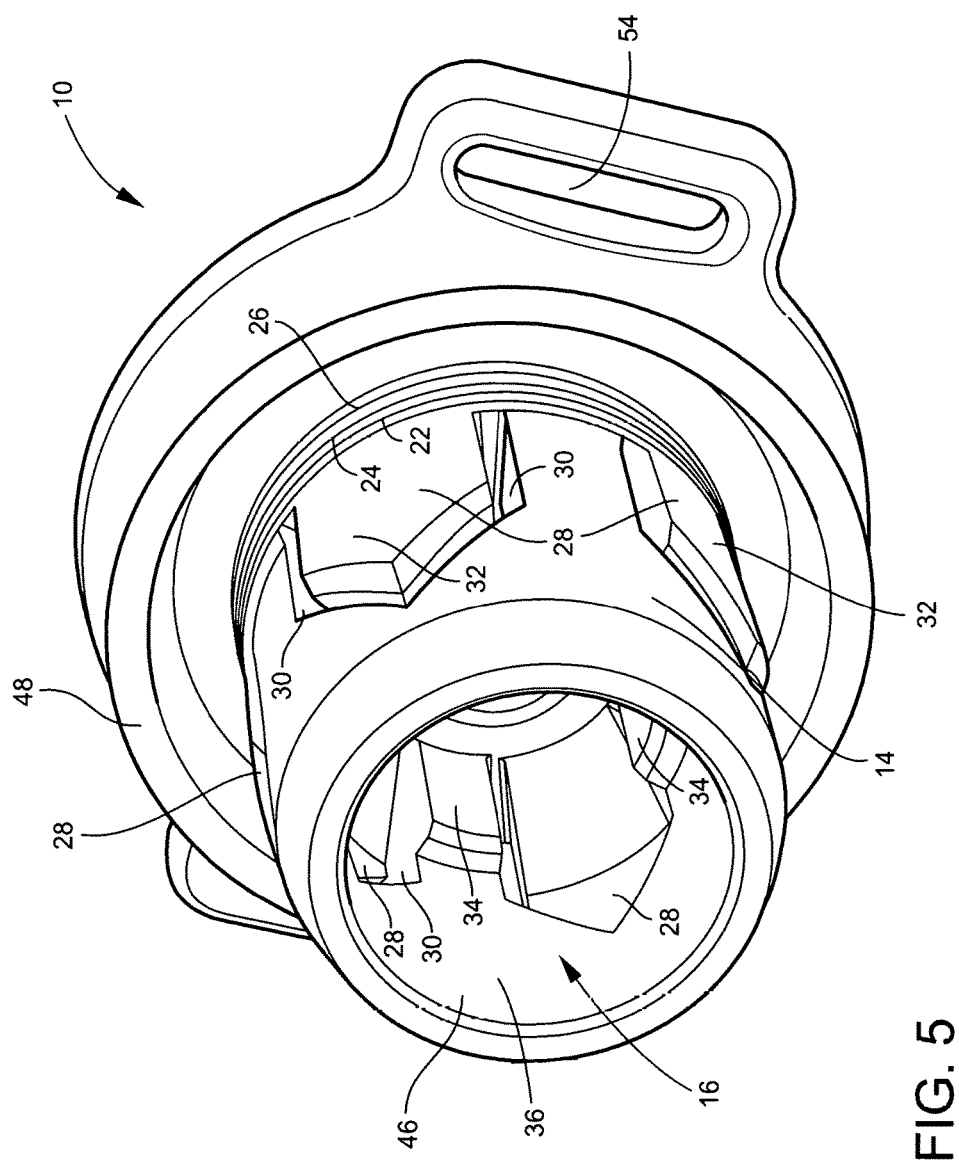
FIG. 5 is a bottom perspective view of the cap of FIG. 1.

Bottle 18 is filled with water in known manner. Tube 44 may have a diameter of about ½ inch and may form a press fit with the bottom portion 46 of generally cylindrical portion 14 as shown in FIG. 5. In another embodiment, tube 44 may have a diameter of about ⅜ inch and may be inserted deeper in cap 10 such that tube 44 forms a press fit with a reduced diameter portion of central through hole 16 formed by protrusions 34. Cap 10 may be fixed in neck 20 by a press fit with one of a plurality of rings 22, 24, 26 (see FIG. 5, for example) and by the pressure of a plurality of cantilevered, pointed rectangles 28 (See FIG. 5, for example) on the interior of the neck 20.

Figure 2:
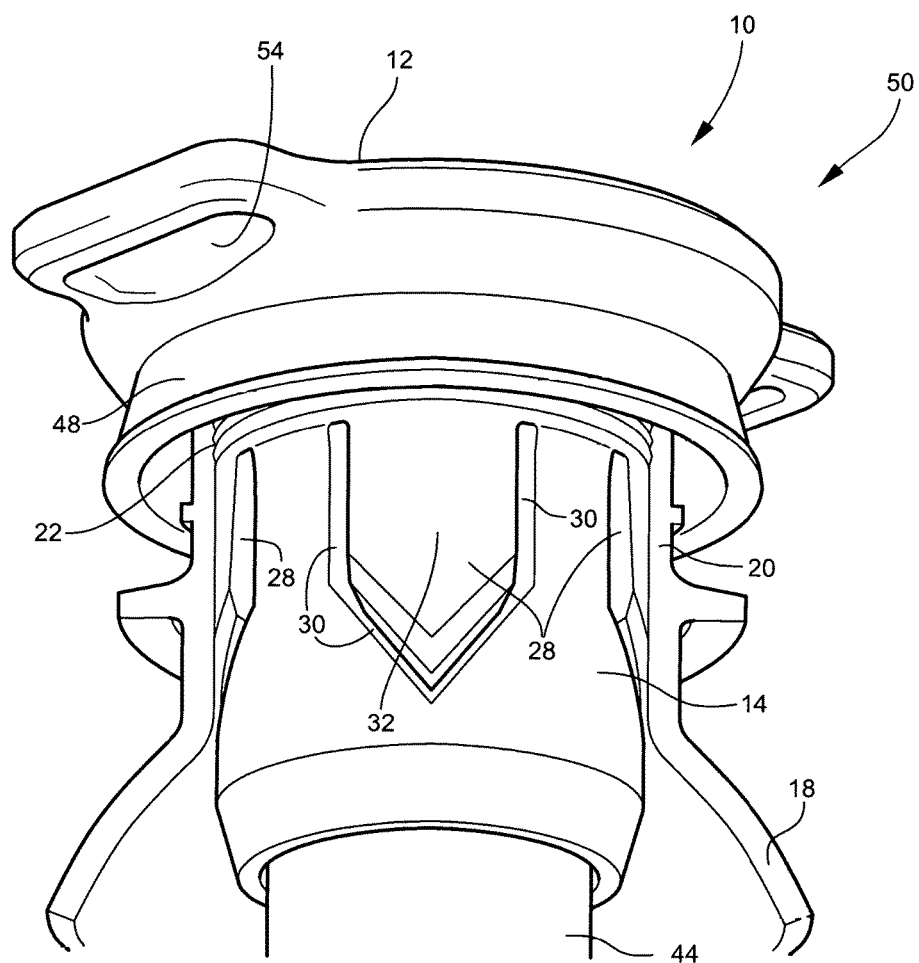
FIG. 2 is another cutaway perspective view of the cap of FIG. 1 inserted in a drinking bottle for making an explosive water charge. Only the upper portion of the bottle is shown.

The features of cap 10 may be better seen in FIGS. 2 and 5. Cap 10 includes a central through hole 16 and a top surface 12. A generally cylindrical portion 14 extends downwardly from the top surface 12 and is configured for insertion in neck 20 of drinking bottle 18. A plurality of rings 22, 24, 26 may be formed on an outer surface of the generally cylindrical portion 14. The number of rings may vary. Three rings are shown in the exemplary embodiment in the Figs. The rings 22, 24, 26 increase in diameter toward top surface 12. Thus, ring 22 has the smallest diameter and ring 26 has the largest diameter. The rings 22, 24, 26 provide a press fit with the interior diameter of the neck 20 of a drinking bottle 18. The various sized rings accommodate necks with small variations in internal diameter.

A plurality of cantilevered, pointed rectangles 28 may be disposed below the plurality of rings 22, 24, 26. Rectangles 28 may be defined by slots 30 formed through the generally cylindrical portion 14. Outer surfaces 32 of the rectangles 28 may be offset radially outward from the outer surface of the generally cylindrical portion 14. The cantilevered nature of rectangles 28 enables the rectangles 28 to flex inwardly when inserted in a neck 20 and then, when seated in neck 20, rectangles 28 may apply outward pressure against the interior of neck 20 to fix cap 10 to bottle 18. In one exemplary embodiment, the flexible rectangles 28 may accommodate interior neck diameters from about 0.84 inches to about 0.865 inches.

The combination of the rings 22, 24, 26 and the cantilevered, pointed rectangles 28 enables a water tight fit without the use of additional seals such as, for example, O-rings or gaskets.

Cap 10 may receive and hold two different sized tubes 44 that contain energetic material. As noted above, the larger diameter tube 44 may form a press fit with the bottom portion 46 of central through hole 16, as shown in the FIG. 1. For the smaller diameter tube (not shown), a plurality of protrusions 34 are formed on the interior surface of the generally cylindrical portion 14 to thereby define a reduced diameter opening in the central through hole 16. The smaller diameter tube (not shown) forms a press fit with the reduced diameter portion of central through hole 16 formed by protrusions 34. The plurality of protrusions 34 are formed in areas between the plurality of cantilevered, pointed rectangles 28.

Figure 3:
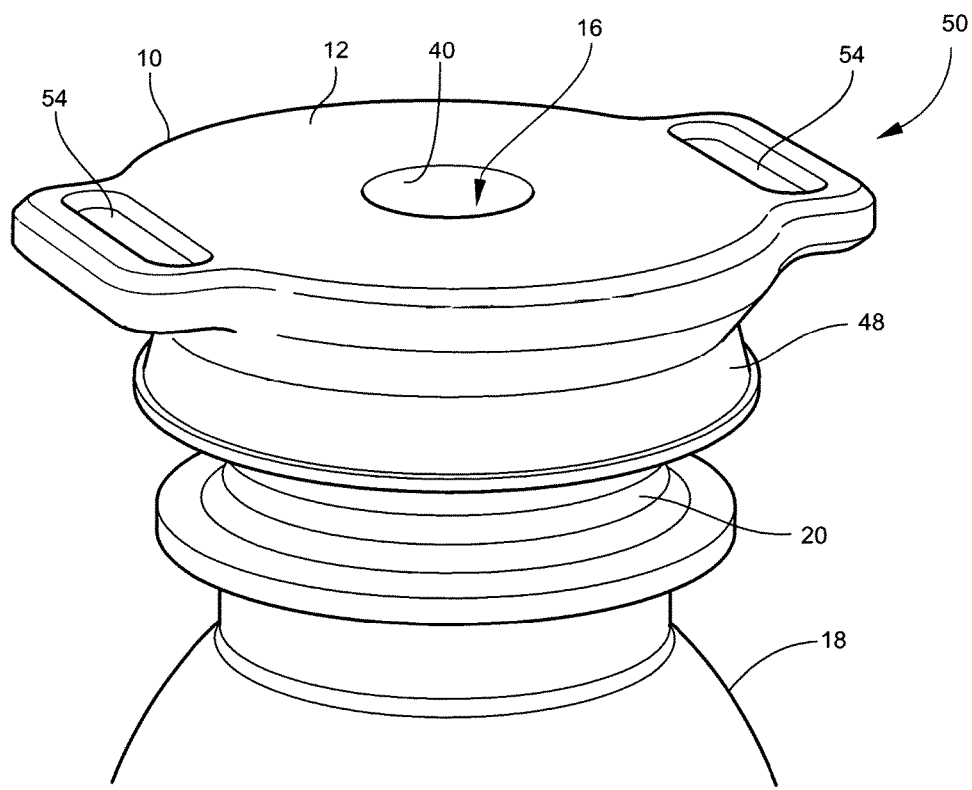
FIG. 3 is a perspective view of the cap of FIG. 1 inserted in a drinking bottle for making an explosive water charge. Only the upper portion of the bottle is shown.

In FIG. 3, a circumferential skirt 48 may extend downwardly from the top surface 12 radially outward of the generally cylindrical portion 14. The top surface 12 may include one or more slots 54. Slots 54 can be used with tape, zip ties, etc. to carry charge bottle 18 or to fasten multiple bottles 18 together.

The cap 10 may be manufactured by an additive process, such as printing with a 3D printer. The cap 10 may be made of a rigid plastic, for example acrylonitrile butadiene styrene (ABS).

Any numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A cap for an explosive water charge, comprising:
    a central through hole;
    a top surface;
    a generally cylindrical portion extending downwardly from the top surface and configured for insertion in a neck of a drinking bottle;
    a plurality of rings being formed on an outer surface of the generally cylindrical portion, wherein a diameter of each of the plurality of rings increases in a direction toward the top surface;
    a plurality of cantilevered, pointed rectangles being disposed below the plurality of rings and being defined by slots formed through the generally cylindrical portion, wherein the outer surfaces of the rectangles are offset radially outward from the outer surface of the generally cylindrical portion;
    a plurality of protrusions being formed on an interior surface of the generally cylindrical portion, wherein the plurality of protrusions define a reduced diameter opening in the central through hole; and
    a detonator and a tube of energetic material being disposed in the central through hole.

2. The cap of claim 1, wherein the central through hole includes a countersink at the top surface configured to receive a detonator.

3. The cap of claim 1, wherein the plurality of protrusions are formed in areas between the plurality of cantilevered, pointed rectangles.

4. The cap of claim 3, wherein the reduced diameter opening is configured to receive a tube of a first diameter with a press fit.

5. The cap of claim 3, wherein the reduced diameter opening is configured to receive a tube of a first diameter with a press fit, and wherein a bottom of the central through hole is configured to receive a tube of a second diameter with a press fit wherein the second diameter is greater than the first diameter.

6. The cap of claim 3, further comprising a circumferential skirt extending downwardly from the top surface radially outward of the generally cylindrical portion,
    wherein the reduced diameter opening is configured to receive a tube of a first diameter with a press fit, and
    wherein a bottom of the central through hole is configured to receive a tube of a second diameter with a press fit wherein the second diameter is greater than the first diameter.

7. The cap of claim 1, wherein the plurality of rings is comprised of three rings.

8. An explosive water charge, comprising:
    the cap of claim 1; and
    a drinking bottle including a neck;
    wherein the cap is fixed to the neck by a press fit with one of the plurality of rings and by pressure of the plurality of cantilevered, pointed rectangles on an interior of the neck.

9. The charge of claim 8, wherein the drinking bottle is a commercial off the shelf (COTS) personal drinking bottle.

10. The charge of claim 9,
    wherein the tube of energetic material forms a press fit with a bottom of the central through hole.

11. The charge of claim 9,
wherein the tube of energetic material forms a press fit with the reduced diameter opening in the central through hole.

12. The charge of claim 9,
wherein one end of the detonator is disposed in the energetic material.

13. The charge of claim 9, further comprising a detonator being disposed in the central through hole in the cap; and
a tube of energetic material being disposed in the drinking bottle and in the cap,
wherein the energetic material is selected from one of C-4 and detonation cord.

14. A method, comprising 3D printing the cap of claim 1.

* * * * *